(12) United States Patent
Kleihorst et al.

(10) Patent No.: US 8,358,370 B2
(45) Date of Patent: Jan. 22, 2013

(54) FLASH LIGHT COMPENSATION SYSTEM FOR DIGITAL CAMERA SYSTEM

(75) Inventors: Richard Petrus Kleihorst, Kasterlee (BE); Serafim Efstratiadis, Thessaloniki (GR)

(73) Assignee: NXP B.V., Eindhoven (NL)

( * ) Notice: Subject to any disclaimer, the term of this patent is extended or adjusted under 35 U.S.C. 154(b) by 146 days.

(21) Appl. No.: 12/746,336

(22) PCT Filed: Dec. 3, 2008

(86) PCT No.: PCT/IB2008/055075
§ 371 (c)(1),
(2), (4) Date: Jun. 4, 2010

(87) PCT Pub. No.: WO2009/072070
PCT Pub. Date: Jun. 11, 2009

(65) Prior Publication Data
US 2010/0283870 A1   Nov. 11, 2010

(30) Foreign Application Priority Data
Dec. 5, 2007  (EP) .................................... 07122401

(51) Int. Cl.
*H04N 5/20* (2006.01)
*H04N 5/232* (2006.01)
*H04N 5/222* (2006.01)

(52) U.S. Cl. .......................... 348/371; 348/255; 348/350

(58) Field of Classification Search .................... 348/42, 348/46, 59, 255, 350, 370, 371
See application file for complete search history.

(56) References Cited

U.S. PATENT DOCUMENTS

| | | | |
|---|---|---|---|
| 5,130,739 A | | 7/1992 | O'Such et al. |
| 6,900,840 B1 * | | 5/2005 | Schinner et al. .......... 348/333.01 |
| 7,397,511 B2 * | | 7/2008 | Ezawa .......................... 348/373 |
| 7,889,252 B2 * | | 2/2011 | Tamura et al. ................ 348/272 |
| 2002/0150308 A1 * | | 10/2002 | Nakamura .................... 382/286 |
| 2003/0052991 A1 | | 3/2003 | Stavely et al. |
| 2003/0137597 A1 | | 7/2003 | Sakamoto et al. |
| 2005/0157204 A1 | | 7/2005 | Marks |
| 2007/0098387 A1 | | 5/2007 | Turley et al. |
| 2008/0218611 A1 * | | 9/2008 | Parulski et al. ............... 348/262 |

FOREIGN PATENT DOCUMENTS

| | | |
|---|---|---|
| EP | 1 313 329 A2 | 5/2003 |
| JP | 2004-328657 A | 11/2004 |
| JP | 2005-354199 A | 12/2005 |
| WO | WO 2006059365 A1 * | 6/2006 |

OTHER PUBLICATIONS

International Search Report and Written Opinion for Application No. PCT/IB2008/055075 (Dec. 3, 2008).

* cited by examiner

*Primary Examiner* — Timothy J Henn

(57) ABSTRACT

The invention refers to a flash light compensation system and corresponding method for digital camera systems, wherein a luminance compensation is carried out on an image of a scene (3) picked-up by an image sensor (1), on the basis of a respective intensity field measured by a plurality of sensors (4, 5), when the scene is illuminated by flash light emitted by a flash device (2). Depending upon the output signals of the plurality of sensors a depth field of the scene is estimated, and this estimation provides a basis for the luminance adjustment on the scene picked up as an image while illuminated by the flash device. The system and method is suitable for effectively reducing the problem of unevenly distributed lighting on a picked-up image of the scene.

17 Claims, 2 Drawing Sheets

FLASH LIGHT COMPENSATION SYSTEM FOR DIGITAL CAMERA SYSTEM

FIELD OF THE INVENTION

The present invention relates to a flash-light compensation system which is based on a depth-field measurement and applicable to standard consumer digital cameras or SLR/professional digital camera system as well as to a method of controlling a flash light compensation system.

BACKGROUND OF THE INVENTION

An image input device and an image input method of a digital camera are disclosed in JP 2004-328657, wherein in an image a depth information is obtained. The image input device comprises an imaging means for taking an image of an object to be photographed based on a set exposure time interval. A light emitting device is provided for radiating light to the object. Upon instructing an exposure the exposure time is set to a first time interval, and by means of the light emitting means light is radiated to the object of imaging. A first image of the object is taken by the imaging means, and thereafter a second image is taken by the imaging means without radiating light to the object. The exposure time of the second image is set to the first time interval. The difference between the first and the second image is detected. A third image is obtained which represents the intensity distribution of reflected light by the object of imaging of light radiated to the object by the light emitting means, and which comprises a depth information on the object of imaging.

Moreover, JP 2005-354199 discloses an imaging apparatus and control method thereof, wherein a light emitting means is provided for carrying out a light emission to a scene to be photographed. For obtaining exposure information to control the imaging apparatus a preliminary light emission is performed before a main light emission is carried out in conjunction with a main exposure. The light of the preliminary light emission reflected by the object is measured by a first photometry means. The imaging apparatus further comprises a second photometry means for applying a direct photometry to a flash-light emission when the preliminary light emission is carried out. A following main light emission is controlled on the basis of the detection result of the photometry information measured by the first and second photometry means during preliminary light emission. After flash photography, the picked-up image is made subject to a luminance correction based on the light emission amount measured by the second photometry means to obtain a stable luminance by eliminating variations in the luminance of the picked-up image due to variations in the light emission amount of the flash-light tube.

However, a correct exposure result cannot be obtained in conjunction with the use of flash-light since a farther part of the scene basically remains dark whereas a portion of the scene closer to the photographer appears too bright due to the flash operation.

SUMMARY OF THE INVENTION

It is therefore an object of the present invention to provide a flash-light compensation system which ensures a compensation for an unevenly distributed lighting on an image picked-up by an image sensor.

According to the present invention, this object is accomplished by a flash-light compensation system for a digital camera according to the features put forward in claim 1, as well by a method of controlling a flash light compensation system for a digital camera system according to the features put forward in claim 10.

Accordingly, the present invention provides a flash-light compensation system for a digital camera comprising a camera which includes an image sensor for picking-up an image of a scene to be photographed, a flash device for emitting light to the scene, and a plurality of sensors for measuring the respective field intensities and generating corresponding output signals. The system further comprises a depth field estimator for estimating on the basis of the output signals of the plurality of sensors a depth field of the scene, and a compensator unit for providing a luminance adjustment on the scene picked-up by the image sensor and being illuminated by the flash device, based on the depth field estimation by the depth field estimator.

Hence, by means of the flash-light compensation system for a digital camera it is possible to measure the depth field of a scene in order to be used for luminance adjustment of the scene of the picked-up image on the basis of the depth field estimation provided by the depth field estimator. The image of the scene picked-up by the image sensor is taken in conjunction with illumination (light emission) by the flash device. Unevenly distributed lighting on the image of the scene can be compensated for by the luminance adjustment based on the depth information derived from the output signals of the plurality of sensors.

The plurality of sensors are preferably arranged spaced from each other. They can be arranged on opposing edges of the digital camera system. Moreover, the plurality of sensors can be arranged spaced from each other according to a predetermined distance.

Accordingly, it is possible to obtain a spatial information about the staggered depth of the entire image of the scene to be photographed. The illumination adjustment on the image of the scene on the basis of the estimated depth information leads to a quality improvement for compensating for the limited possibilities of the (many times) inadequate scene lighting from the camera flash light.

The plurality of sensors are further adapted for performing a measurement to the respective intensity field simultaneously. The basis for the estimated depth information is therefore obtained at one exposure process by simultaneous sensing operation or measurement operation of the plurality of sensors.

Furthermore, the plurality of sensors perform measurement of the background versus the foreground distance of the scene to be photographed, and the compensator unit is adapted to control an increase of the intensities in regions of the scene far from the camera and a lowering of the intensities in regions of the scene closer to the camera. That is, by means of the measurement carried out by the plurality of sensors the distances of the background of scene and the foreground of the scene being closer to the camera are detected, thereby obtaining an information of the staggered depth of the entire scene picked-up by the image sensor. In particular regions of the scene on the basis of the picked-up image a lowering or an increase of intensities is carried out to perform the desired luminance adjustment on the scene illuminated during the image picked-up process by the flash light emitted by the flash device.

The flash-light compensation system further comprises a noise reduction unit which is adapted to provide a spatial filtering operation to predetermined portions of the scene. This is to compensate for the amplified noise in the predetermined portions of the scene. Specifically, a spatial filtering operation is provided to a darkened portion of the scene, so that in the course of the luminance adjustment on the scene compensation is provided for the amplified noise at the dark picture areas where the compensating filter is expected to introduce a greater (or the greatest) effect.

According to the method of controlling a flash light compensation system for a digital camera system, the method comprises the steps of: picking-up an image of a scene to be photographed, emitting flash light to said scene, measuring a respective intensity field by a plurality of sensors and generating corresponding output signals, estimating on the basis of said output signals a depth field of said scene, and providing a luminance adjustment on the scene illuminated by the flash light based on the depth field estimated in the estimating step.

The present invention, therefore, presents a flash-light compensation system and a corresponding method of controlling a flash light compensation system for a digital camera which makes use of a means for measuring the depth-field of a scene in order to be used for effectively reducing the problem (undesired effect) of unevenly distributed lighting on the recorded (captured, picked-up) image of an image sensor in combination with the image measurement of the image, in standard consumer or SLR (single lens reflex)/professional digital cameras.

The invention refers to a flash light compensation system for digital camera systems, wherein a luminance compensation is carried out on an image of a scene picked-up by an image sensor, on the basis of a respective intensity field measured by a plurality of sensors, when the scene is illuminated by flash light emitted by a flash device. Depending upon the output signals of the plurality of sensors a depth field of the scene is estimated, and this estimation provides a basis for the luminance adjustment on the scene picked up as an image while illuminated by the flash device. The system and method is suitable for effectively reducing the problem of on evenly distributed lighting on a picked-up image of the scene.

These and other aspects of the invention will be apparent from and elucidated with reference to the embodiments described hereinafter in conjunction with the drawings.

DETAILED DESCRIPTION OF EMBODIMENTS

Embodiments of the present invention will be described hereinafter on the basis of FIGS. 1 and 2.

Figure 1:
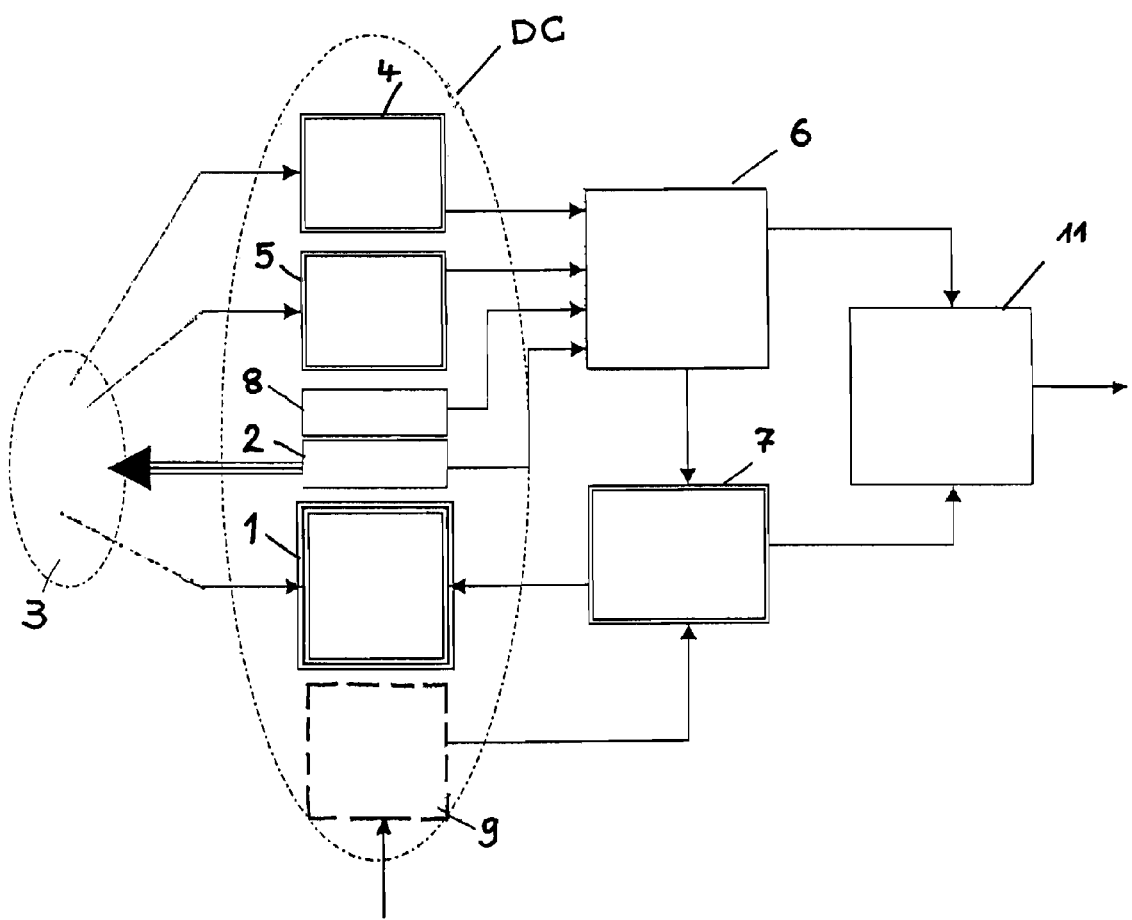
FIG. 1 shows an overall diagrammatic view of the flashlight compensation system for a digital camera according to an embodiment of the present invention.

According to FIG. 1 which illustrates an example of a flash-light compensation system for a digital camera or for digital camera systems, a camera and the corresponding elements thereof are surrounded by a dashed line.

The digital camera system DC comprises an image sensor 1 for picking-up an image, as well as a flash device 2 for illuminating a scene 3 which is to be photographed.

When photographing the scene 3 the image sensor 1 provided for example in the form of CCD sensor or a CMOS sensor, picks-up the image of the scene 3 illuminated by the illumination light radiated from the flash device 2 to the scene 3. The scene 3 can also be illuminated by environmental light, and the illumination by the flash device provides the main illumination of the scene 3 to be photographed. The digital camera system further comprise are a plurality of sensors 4 and 5 which are arranged on the digital camera system and which are used to measure the illuminating conditions (exposure conditions) of the scene to be photographed. In more detail, the plurality of sensors which constitute auxiliary sensors and can be provided as low cost sensors, are used to measure the respective intensity field of the scene 3 to be photographed and provide or generate corresponding output signals for further data evaluation. The generated corresponding output signals of the plurality of sensors are indicative of the respective intensity field of the scene 3.

The plurality of sensors 4 and 5 can according to an embodiment be provided by at least two sensors constituting stereo sensors in this embodiment, that is, at least a first and a second sensor 4 and 5, or by more than two sensors arranged on the digital camera system DC.

In particular, the plurality of sensors 4 and 5 for detecting the respective intensity field may be arranged on the digital camera system DC at different locations having a predetermined distance from each other. The arrangement is preferably on the front surface of the digital camera system DC at specified locations, whereas also sensors arranged on the top surface of the digital camera system DC can measure depth information of a height above the photographer. Instead of the preferred first and second sensors 4 and 5 (stereo sensors), three sensors can be arranged at predetermined positions on the digital camera system DC, or four sensors can be arranged preferably according to a certain symmetry on the digital camera system DC according to different embodiments. Four or more sensors can be used to obtain the desired measurement of the respective intensity field according to a predetermined data evaluation of the generated corresponding output signals of the plurality of sensors 4 and 5.

The output signals of the plurality of sensors 4 and 5 or the respective first and second sensors are supplied to a depth field estimator 6 which is provided for estimating the depth field of the scene 3. In particular, the depth field estimator 6 estimates on the basis of the output signals of the plurality of sensors 4 and 5 the depth field of the scene 3. The plurality of sensors 4 and 5 may be provided as a means to obtain a depth estimate per pixel either stereo disparity estimation or a time-of-flight matrix sensor that can be extrapolated to information per pixel.

The estimated depth field based on the output signals of the plurality of sensors 4 and 5 is supplied to a compensator unit 7 which is able to provide a control of the image sensor (main sensor) 1 and can provide a luminance adjustment on the scene which is picked-up by the image sensor 1 and illuminated by radiated light from the flash device 2.

The luminance adjustment performed by the compensator unit 7 is based on the depth field estimation carried out by the depth field estimator 6.

A noise reduction unit 11 can be connected to the depth field estimator 6 and the compensator unit 7 and can perform a compensation for noise in the complete picked-up image of the scene 3 or in specific portions thereof. The noise reduction unit 11 can output the final picture of the scene 3. This is denoted by an arrow in FIG. 1 extending from the noise reduction unit 11.

The system further includes a user interface 9 which allows the user to adjust the amount of compensation. To this end, the user interface 9 is connected to the compensator unit 7. The user interface 9 enables connection to external devices, such as host computers or personal computers, or the user can directly input corresponding instruction reflecting user preferences. This is denoted by an arrow directed to the user interface 9.

Figure 2:
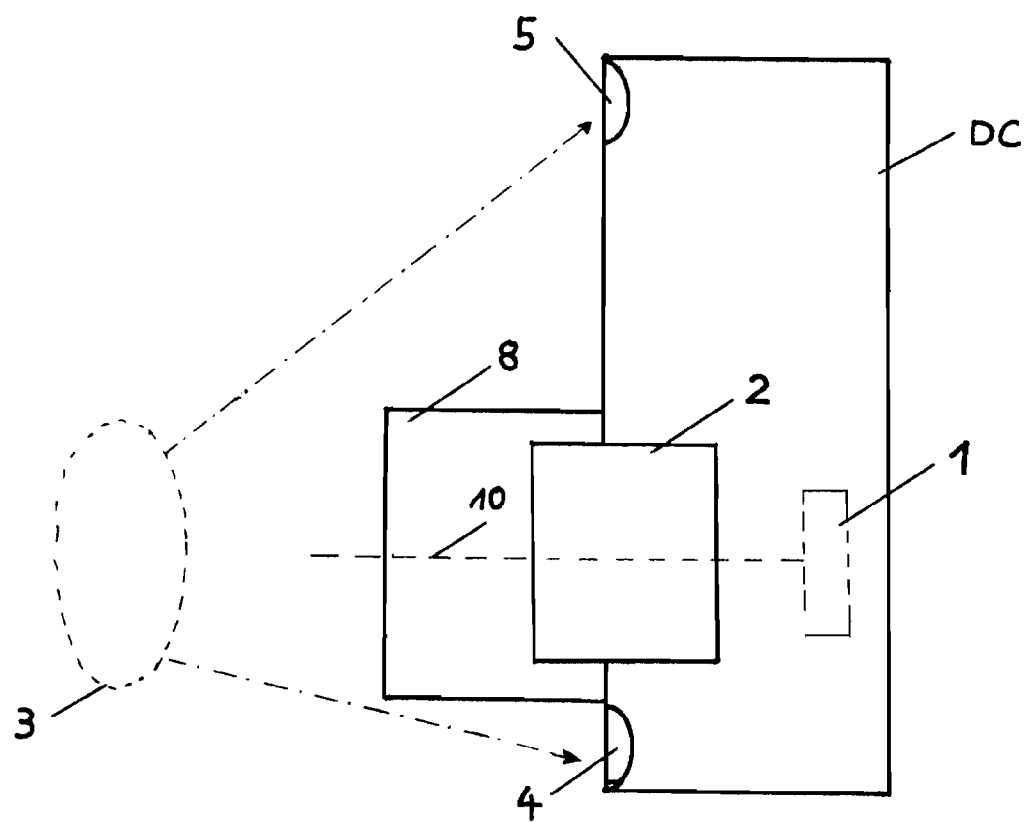
FIG. 2 shows in a schematical representation the plan view of a digital camera system according to an embodiment of the present invention.

Regarding FIG. 2, there is shown schematically a plan view of the digital camera system DC, having a lens 8 which receives reflected light from the scene 3 to be photographed and generates an image of the scene on the image sensor 1 located in the digital camera system DC at an optical axis 10 of the objective lens 8. The objective lens 8 may be a fixed lens integrally provided to the digital camera system DC or may be a removably attachable objective lens 8.

On the digital camera system DC the flash device 2 is provided either as a built-in flash device of the digital camera system DC or a separately arranged flash device which can be detachably mounted to the digital camera system DC.

The plurality of sensors 4 and 5 or in particular the first and second sensors can be respectively arranged at opposing edges of the digital camera system DC on the front surface thereof facing the scene 3 to be photographed, as is shown in FIG. 2, so that the plurality of sensors 4 and 5 are located spaced from each other according to a predetermined distance. The predetermined distance between the plurality of sensors 4 and 5 may be defined approximately by the dimensions of the digital camera system DC and may vary depending upon the outer shape and the dimensions thereof. In the case the plurality of sensors 4 and 5 includes more than two sensors, these plural sensors can be distributed to and arranged on the front surface of the digital camera system DC in a predetermined manner.

In the following the function of the flash-light compensation system according to the present invention is explained.

Referring back to FIG. 1, when an exposure operation is to be carried out by the digital camera system DC the image sensor 1 picks up an image of the scene 3 which is illuminated by a flash illumination (radiated flash light) by the flash device 2. The image to be picked up by the image sensor 1 is generated on the image sensor 1 by the objective lens 8 and directed along the optical axis 10 onto the image sensor 1.

The plurality of sensors 4 and 5 are simultaneously operated and measure the respective field intensities and generate corresponding output signals representative of the measured field intensities. The field intensities are brightness or illumination intensities of the scene 3 to be photographed. The plurality of sensors 4 and 5 are provided separately from the image sensor 1 which constitutes the main sensor, and are preferably located on the digital camera system DC having at least a predetermined distance between the respective sensors 4 and 5.

The simultaneous operation of the plurality of sensors 4 and 5, resulting in the generation of output signals of these sensors indicative of the field intensities of the scene 3 to be photographed provides the basis for a depth estimation to be carried out by the depth field estimator 6 which is supplied with the respective output signals of the plurality of sensors 4 and 5. The depth field estimation is carried out for the entire scene 3 to be photographed at a time. This scene usually includes the main object upon which the digital camera system DC is directed, and more specifically the objective lens 8 thereof is focused.

The depth field estimation carried out at a time by the depth field estimator 6 in conjunction with the simultaneous operation of the plurality of sensors 4 and 5 avoids severe problems which would occur in case of photographing moving objects.

The depth field estimated by the depth field estimator 6 and supplied to the compensator unit 7 serves as a basis for providing image enhancement and in particular the luminance adjustment on the entire scene 3 to be photographed and which is illuminated by flash light from the flash device 2 radiated to the scene 3.

The luminance adjustment on the scene provides a compensating for the limited possibilities of the (many times) inadequate scene lighting from the flash light irradiated on the scene 3 by the flash device 2 of a digital camera system DC.

Basic information is derived from the measurement of the background versus the foreground distance by means of the plurality of sensors 4 and 5 by specifically measuring the respective intensity field for consequently estimating the depth field of the scene 3 by means of the depth field estimator 6 to which the output signals of the plurality of sensors 4 and 5 are supplied.

The depth information provided by the depth field estimator 6 is then used to control an increase of intensities in the far regions and a lowering of the intensities in the regions closer to the camera. That is, by means of the depth field estimation the intensity detection by the plurality of sensors 4 and 5 is correlated with the depth information 3 of the scene to be photographed estimated by the depth field estimator 6. The depth field includes information about an object which is the target of photographing and which is located in and therefore forming part of the scene 3 to be photographed, as well as about the entire background of the scene 3.

Depth field estimation is therefore performed for the entire scene 3, and consequently for the different portions of the scene included in the image picked-up by the image sensor 1 and being ranged in the foreground distance or background distance.

The luminance adjustment is achieved by compensating the measured reflected light intensity detected by the plurality of sensors 4 and 5 and using a filter (method) which enables improvement of the overall image especially at the areas corresponding to objects belonging to the background. Although such background objects or background in general may not be of great importance to the content of the picture for the user, however, the background portions of the scene 3 to be photographed and, thus, of the entire image picked-up by the image sensor 1 may be important in contributing to the overall image quality since the background portions provide a means to regularize the overall picture and to reduce the extremely great contrast which is typically observed in images provided by existing consumer cameras when having an exposure operation in conjunction with flash light illumination. The luminance adjustment on the scene 3 therefore provides a processing of the picked-up image and constitutes a quality improvement tool for compensating for the limited possibilities of the inadequate scene lighting from the camera flash light (illumination by the flash device 2).

The requirements for providing such result is an approximate estimate of the true depth field of the scene 3 by the depth-field estimator 6, a measurement of the background versus the foreground distance, a balance equation to compensate for the luminance adjustment and in particular a contrast adjustment, and an optional spatial filtering operation to be carried out by the noise reduction unit 11 (FIG. 1) to compensate for the amplified noise at the darkened image areas (which correspond to predetermined portions of the scene 3) where the compensating filter is expected to introduce a greater (or the greatest) effect. The present invention therefore provides far superior information in order to do image enhancement. More specifically, a three-dimensional correlation of depth field and intensity field is provided based on the respective output signals of the plurality of sensors 4 and 5 and in conjunction with the depth estimation by the depth field estimator 6.

These requirements are fulfilled according to the features discussed above.

The same techniques may also be useful in restoring the image quality due to the performance of inexpensive lenses that have uneven (or highly non-linear) light reflectance properties, that is, they are less sensitive to light sources which are further away and are located off the center of the lens. An associated effect to this problem is the one usually referred to a fisheye or barrel effect, typically observed in inexpensive lenses, which also decreases the image quality.

For considering an information about the above-described devices of the camera, an information about the flash intensity or infrared flash focus may also be input from the camera to the system along with information regarding the lens type and the shooting parameters (exposure conditions such as shutter speed, aperture focal distance, etc.).

The user interface 9 enables a connection of the flash light compensation system used in a typical digital camera system with devices such as personal computers outside the flash light compensation system. An access to the flash light compensation system from the outside is therefore possible for the user, and the user is allowed to adjust the amount of compensation according to his preference either for every picture or for each picture after a preview on the camera monitor screen (LCD screen). In addition, user preferences are required to adjust the amount of smoothness that needs to be applied to the flash light compensated picture. This spatially adaptive filtering is applied to the areas of the picture mainly belonging to the background, according to the depth estimation result provided by the depth field estimator 6 based on the output signals of the plurality of sensors (preferably first and second sensors 4 and 5) arranged in a predetermined manner on the front surface of the digital camera system DC facing the scene 3 to be photographed. Otherwise, in case there are no dominant objects in the scene 3, the filtering process may be applied evenly to the entire image picked up by the image sensor 1. The filtering process can therefore optionally be provided according to the user's intention.

While the invention has been illustrated and described in detail in the drawing and foregoing description, such illustration and description are to be considered illustrative or exemplary and are not restrictive; the invention is not limited to the disclosed embodiments described above.

The steps of the method of controlling the flash light compensating system of a digital camera system comprises the above-mentioned steps, and these steps do not exclude other elements or steps covered by the scope of the appended claims. Reference signs are not to be construed as limiting the scope.

The invention claimed is:

1. A flash light compensation system for a digital camera system, comprising:
   a camera including an image sensor for picking-up an image of a scene to be photographed,
   a flash device for emitting light to said scene, and
   a plurality of sensors for measuring the respective intensity field and generating corresponding output signals,
   a depth-field estimator for estimating, based on the output signals of said plurality of sensors, a depth field of the scene,
   a compensator unit for providing a luminance adjustment on the scene picked-up by the image sensor and illuminated by the flash device, based on the depth field estimation by the depth-field estimator, wherein the compensator unit is further configured to receive a flash input indicative of a flash intensity or a flash focus,
   a display screen to display a preview of the image of the scene to be photographed, and
   a user interface to receive a user input and to communicate the user input to the compensator unit to adjust an amount of compensation of the luminance adjustment after the preview is displayed.

2. System according to claim 1, wherein said plurality of sensors are arranged spaced from each other.

3. System according to claim 2, wherein said plurality of sensors are arranged spaced from each other according to a predetermined distance.

4. System according to claim 1, wherein said plurality of sensors comprise a first sensor and a second sensor which are arranged at opposing edges of said camera.

5. System according to claim 1, wherein said plurality of sensors are adapted for simultaneously performing measurement of said respective intensity field.

6. System according to claim 1, wherein said plurality of sensors are adapted for performing measurement of the background distance versus the foreground distance of the scene.

7. System according to claim 1, wherein said compensator unit is adapted for controlling an increase of intensities in regions of the scene far from said camera and a lowering of intensities in regions of the scene closer to said camera.

8. System according to claim 1, further comprising a noise reduction unit adapted to provide a spatial filtering operation to predetermined regions of the scene.

9. System according to claim 8, wherein said noise reduction unit is adapted to provide said spatial filtering operation to darkened portions of the scene.

10. A digital camera system, comprising:
    a flash light compensation system according to claim 1.

11. A system according to claim 9, wherein the user interface is further configured to receive a second user input and to communicate the second user input to the noise reduction unit to adjust an amount of smoothness applied to imaged scene.

12. A system according to claim 1, wherein the compensator unit is further configured to receive a lens input indicative of a lens type of a lens used to photograph the scene.

13. A system according to claim 1, wherein the compensator unit is further configured to receive an exposure input indicative of at least one exposure condition of the imaged scene.

14. A method of controlling a flash light compensation system of a digital camera system, comprising the steps of:
    picking-up an image of a scene to be photographed while emitting flash light to said scene,
    measuring a respective intensity field by a plurality of sensors and generating corresponding output signals,
    estimating, based on said output signals, a depth field of said scene,
    receiving a lens input indicative of a lens type of a lens used to photograph the scene
    displaying a preview of the image of the scene to be photographed to a user,
    receiving a user input from the user to set a luminance adjustment for the scene after the preview is displayed,
    communicating the user input to set the luminance adjustment for the scene, and
    providing the luminance adjustment on the scene illuminated by the flash light based on the depth field estimated and the user input from the user.

15. A method according to claim 14, further comprising:
    receiving a second user input, and
    adjusting an amount of smoothness applied to an imaged scene based on the second user input.

16. A method according to claim 14, further comprising receiving a flash input indicative of a flash intensity or a flash focus.

17. A method according to claim 14, further comprising receiving an exposure input indicative of at least one exposure condition of the imaged scene.

* * * * *